US006472069B1

(12) United States Patent
Bailey et al.

(10) Patent No.: US 6,472,069 B1
(45) Date of Patent: Oct. 29, 2002

(54) UNSATURATED POLYESTER RESIN COMPOSITIONS COMPRISING METALLIC MONOMERS

(75) Inventors: Michael A. Bailey, Aston, PA (US); Richard Costin, West Chester, PA (US)

(73) Assignee: Sartomer Technology Company, Inc., Exton, PA (US)

(*) Notice: Subject to any disclaimer, the term of this patent is extended or adjusted under 35 U.S.C. 154(b) by 0 days.

(21) Appl. No.: 09/482,713

(22) Filed: Jan. 13, 2000

Related U.S. Application Data (63) Continuation-in-part of application No. 09/138,268, filed on Aug. 21, 1998, now abandoned.

(51) Int. Cl.$^7$ ............... C08L 63/10; C08L 67/06
(52) U.S. Cl. ............... 428/417; 428/414; 428/431; 428/482; 525/44; 525/48; 525/445; 525/531; 523/466; 523/527
(58) Field of Search ............... 525/44, 48, 445, 525/531; 428/482, 431, 417, 414; 523/466, 527

(56) References Cited

U.S. PATENT DOCUMENTS

| | | | | |
|---|---|---|---|---|
| 3,437,514 A | * | 4/1969 | Burlant | 427/500 |
| 3,933,757 A | * | 1/1976 | Pratt | 525/10 |
| 5,032,630 A | * | 7/1991 | Silf | 523/501 |
| 6,225,380 B1 | * | 5/2001 | Pezron | 523/516 |

FOREIGN PATENT DOCUMENTS

| | | | |
|---|---|---|---|
| GB | 1476380 | * | 6/1977 |

* cited by examiner

*Primary Examiner*—Patricia A. Short
(74) *Attorney, Agent, or Firm*—Michael B. Fein; Cozen O'Connor (57) ABSTRACT

A composition useful as a gel coat, binder, laminating resin or molding resin comprising (A) unsaturated polyester resin which is the reaction product of one or more polyols and one or more ethylenically unsaturated polycarboxylic acids, anhydrides, or amides, and optionally one or more polyethylenically unsaturated monomers, and/or a vinyl ester resin, (B) one or more first monomer selected from the group consisting of styrene, vinyl toluene, methyl methacrylate, N-vinyl pyrolidone, ethylene glycol dimethacrylate and the dimethacrylate of alkoxylated Bisphenol A, and (C) a second monomer selected from the group consisting of metal salts of an alpha, beta-ethylenically unsaturated carboxylic acids without a loss in heat distortion temperature properties.

17 Claims, 3 Drawing Sheets

UNSATURATED POLYESTER RESIN COMPOSITIONS COMPRISING METALLIC MONOMERS

This application is a continuation-in-part of Ser. No. 09/138,268, filed Aug. 21, 1998, and now abandoned.

This invention relates to the field of ethylenically unsaturated polyester or vinyl ester systems which comprise the unsaturated polyester or vinyl ester resin and an unsaturated organic monomer such as styrene which serves as a solvent for the unsaturated polyester or vinyl ester resin and as a reactant to cure the unsaturated polyester or vinyl ester resin. These resin systems are used for laminating, coating, and gel purposes. When used for laminating, the resin systems are typically fiber reinforced, usually with glass fibers.

A well known problem in this art is that the organic monomer tends to volatilize in significant amounts into the workplace environment. Styrene, the most typical organic monomer, is volatile and a suspected carcinogen and there are regulations in place to reduce styrene emissions during the coating or molding processes in industry. Others have proposed replacing part of the organic monomer in order to reduce the volatiles. For example, see Smeal, et al., U.S. Pat. No. 5,500,171, assigned to Aristech Chemical Corporation, and other Smeal, et al., patents also assigned to that assignee, which disclose replacing part or all of the organic monomer such as styrene with a different organic monomer, for example a multifunctional (meth)acrylate such as ethylene glycol dimethacrylate or alkoxylated bisphenol-A diacrylate or dimethacrylate. Others have proposed epoxidized soy bean oil diacrylate and trimethylolpropane trimethacrylate, to be used together to replace part of the styrene.

Lee, U.S. Pat. No. 4,465,806, discloses a conventional unsaturated polyester resin wherein the usual styrene is replaced by a reaction product of a polyepoxy compound and acrylic or methacrylic acid which may be the diacrylate of a polyglycidyl ether of bisphenol-A, wherein a significant portion of the epoxy groups remain unreacted for use in the resin, and subsequently form pendant OH groups.

European Patent Application 0 234 692 discloses a molding resin, having a low residual monomer concentration in the final product, wherein dimethacrylates such as ethoxylated bisphenol-A dimethacrylate can be used to reduce the amount of residual styrene monomer in contained molding processes such as cell molding, compression molding, and sheet molding. See also Reid and Rex U.S. Pat. No. 5,202,366, which includes a low-profile additive in a similar composition.

Such prior compositions do reduce the volatile emissions, but suffer from one or more disadvantages with respect to crosslinked polyester properties, e.g., heat distortion temperature is reduced.

It is therefore an object of this invention to provide an unsaturated polyester or vinyl ester composition useful for laminating, coating, and gel applications, having lower than normal amounts of volatile unsaturated monomer without reducing heat distortion properties and other physical properties.

SUMMARY OF THE INVENTION

This object, and others which will become apparent from the following disclosure, are provided by the present invention which, in one aspect, comprises a composition useful as a gel coat, binder, or laminating resin comprising (A) unsaturated polyester resin which is the reaction product of one or more polyols and one or more ethylenically unsaturated polycarboxylic acids, anhydrides, or amides, and optionally one or more polyethylenically unsaturated monomers, and/or a vinyl ester resin, (B) a monomer which dissolves said polyester or vinyl ester resin selected from the group consisting of styrene, vinyl toluene, methyl methacrylate, N-vinyl pyrrolidone, ethylene glycol dimethacrylate and the dimethacrylate of alkoxylated Bisphenol A, and (C) a second monomer selected from the group consisting of metal salts of an alpha, beta-ethylenically unsaturated carboxylic acids.

In another aspect, the invention comprises a method of preparing a polyester or a vinyl ester gel coat, binder, or laminating resin from a composition comprising an unsaturated polyester resin which is the reaction product of one or more polyols and one or more ethylenically unsaturated polycarboxylic acids, anhydrides, or amides, and/or vinyl ester resin, and a first monomer selected from the group consisting of styrene, vinyl toluene, methyl methacrylate, N-vinyl pyrrolidone, ethylene glycol dimethacrylate and the dimethacrylate of alkoxylated Bisphenol A, the improvement comprising replacing in said composition a portion of said first monomer with a second monomer selected from the group consisting of metal salts of an alpha, beta-ethylenically unsaturated carboxylic acids, resulting in a higher heat distortion temperature property.

Another aspect of the invention is the molded laminates, binder, and gel coatings prepared by the method of the invention from the composition of the invention.

BRIEF DESCRIPTION OF THE INVENTION

DETAILED DESCRIPTION OF THE INVENTION

While many others have sought to provide unsaturated polyester or vinyl ester resins having reduced volatile monomer content, a successful improvement must take into consideration the widely used equipment and techniques of laminating, gel, and coating applications. Among the restrictions imposed by the market are that the improved system must provide minimal increase in cost when commercialized, compatibility between components of the resin system, reactivity that is similar to that of other commercial polyester resins, viscosity that is similar to that of other commercial polyester resins, i.e., about 100 to 400 cps, and in the case of laminating resin, the ability to wet glass and bond to other components of an assembly. Unlike many other prior proposed improvements, the present invention meets all of these criteria.

One of the specific advantages of the replacement of a part of the first monomer by a metal salt monomer is that it enables obtaining unsaturated polyester or vinyl ester resin compositions which at the same global proportion of monomers have significantly lower viscosity than prior art compositions. This lowering effect on viscosity can be further valorized for obtaining compositions which, while having the same viscosity, they additionally have:

lower VOC content or higher resin (polyester or vinyl ester) content;

and/or higher solids content for compositions further containing current solid additives like fillers and/or pigments. Another specific advantage of the metal salt monomers is the thermal stability improvement of flexural strength performances at high temperature (93° C./200F.) with respect to reference acrylic monomers.

1. The Unsaturated Polyester

Suitable unsaturated polyesters for use in the invention are the conventional unsaturated polyesters which are typically used for laminating and gel coating, and which are prepared by polycondensation of polycarboxylic acid derivatives, one of which must be an alpha, beta-ethylenically unsaturated polycarboxylic acid, and polyols. Suitable polycarboxylic acid derivatives include polycarboxylic acids, their esters of lower alcohols, their amides, their acid chlorides, and their anhydrides.

The ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilisation of triols and the like requires the ratio of acid to polyol to be stated more precisely as one equivalent of acid per equivalent of polyol.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprises about 30% or more of the total acid content.

Some of the unsaturated polycarboxylic acids useful in preparing unsaturated polyesters used in this invention include maleic acid, citraconic acid, fumaric acid, glutaconic acid, itaconic acid, chloromaleic acid, mesaconic acid, and the like, wherein the term "acid" is used to include the corresponding anhydrides where such anhydrides exist.

Some of the saturated and aromatically unsaturated polycarboxylic acids optionally useful in preparing unsaturated polyesters used in this invention include phthalic acid, phthalic anhydride, isophthalic acid, tetrahydrophthalic acid, hexahydrophthalic acid, endomethylene tetrahydrophthalic acid, glutaric acid, tetrachlorophthalic acid, suberic acid, hexachloroendomethylene tetrahydrophthalic acid, sebacic acid, tetrahydrophthalic anhydride, succinic acid, adipic acid, and the like, wherein the term "acid" includes the corresponding anhydrides where such anhydrides exist.

Polyols useful in preparing polyesters for use in this invention are polyfunctional alcohols of the type conventionally utilized in polyester preparation. Such polyols include ethylene glycol, 1,5-propanediol, propylene glycol, triethylene glycol, butylene glycol, glycerol, diethylene glycol, 1,4,6-hexanetriol, trimethylolpropane, trimethylolethane, dipropylene glycol, pentaerythritol, neopentyl glycol, alkoxylated 2,2-bis(4-hydroxyphenyl) propane and the like. Although diols are generally preferred in the preparation of unsaturated polyesters, more highly functional polyols, i.e., polyols having a functionality of three to five, are sometimes used. In addition, a polyethylenically unsaturated monomer such as dicyclopentadiene or Bisphenol A dicyclopentadiene and derivatives thereof is preferably included and may be considered a normal part of the "base" resin as used herein.

Vinyl ester resins may replace totally or partly unsaturated polyester resins. Vinyl ester resins, suitable for the invention, may be any vinyl ester resin known to a man skilled in the art. Examples of such resins are Bisphenol A-based acrylated oligomers and more particularly alkoxylated Bisphenol A-based acrylated oligomers.

2. Unsaturated Monomer

Suitable unsaturated monomers, referred to herein as the first monomer, are those which are conventionally used in this art of laminating resins, gel coating, molding resins, and the like, with unsaturated polyesters. The most typical unsaturated monomer is, of course, styrene. Other conventional monomers are vinyl toluene, methyl methacrylate, N-vinyl pyrrolidone, ethylene glycol dimethacrylate, and the dimethacrylate of alkoxylated Bisphenol A. Mixtures of monomers may be used, for example a mixture of styrene and the dimethacrylate of alkoxylated Bisphenol A. The amount of first monomer is reduced below the conventional amount according to this invention, resulting in the reduced volatiles and emissions. Typical amounts used in the prior art are about 40 to 50 parts by weight per 60 to 50 parts by weight of unsaturated polyester or vinyl ester resin. According to this invention, only about 5 to 47, preferably only about 10 to 30 parts by weight of first monomer are used, based on 50 to 70 parts by weight of unsaturated polyester or vinyl ester resin.

3. Metallic Monomers

According to this invention, metallic monomers are used as "second" monomers to replace a portion of the first monomer(s). Suitable metallic monomers are prepared by reacting metal, for example, calcium, zinc, magnesium, aluminum, and the like, with an unsaturated organic acid, e.g., acrylic acid and/or methacrylic acid, and the like, to form salts. Preferred salts include metal multifunctional (meth)acrylates and more preferably zinc diacrylate, zinc dimethacrylate, calcium diacrylate, and calcium dimethacrylate.

The amount of metallic monomer(s) used may vary from 0.5 to 35 and preferably from at least about 1 to about 30, and more preferably from 1.5 to 15 parts by weight with the condition that (B)+(C) is from 30 to 50 parts for 100 parts by weight of (A)+(B)+(C). The metallic monomer is typically a solid, and therefore has much lower vapor pressure than the first monomer. However, due to its reactivity, the metallic monomer functions to adequately crosslink, i.e., cure, the unsaturated polyester, along with the first monomer. For the lower contents in metallic monomers, the low VOC effect is indirectly obtained by enabling higher polyester or vinyl ester resin contents (solid content) of about 70% or higher for the same viscosity which means lower volatile monomer content (lower VOC).

In a preferred embodiment, the composition comprises as a first monomer styrene and as a second monomer zinc diacrylate, zinc dimethacrylate and calcium dimethacrylate, with the weight ratio of the first monomer to the second monomer between about 2:1 to about 20:1.

4. Addictives and Fillers

In preparing laminating resins, it is most typical to incorporate glass fiber, and the like, to reinforce the molding. Typical types of fibers are the inorganic E-glass (electrical grade) compositions which can be, for example, one or more of silica, calcium oxide, alumina, boron oxide, magnesia, titanium dioxide, ferric oxide and, fluorine. It is also necessary, and conventional, to include a free radical initiator, usually a peroxy catalyst, to promote the cure or crosslinking.

Additional fillers, catalysts, and additives can be used in the composition. More particularly, the compositions of the invention may 20 include from 0. 1 to about 2.0 parts of promoters and free radical initiators selected from the group consisting of cobalt naphthenate, potassium naphthenate and dimethyl acetoacetamide and methyl ethyl ketone peroxide, based on 100 parts of (A), (B) and (C). Transition metals such as cobalt, copper and vanadium can act as catalysts for decomposition of the peroxide initiator below its normal decomposition temperature. They are typically added at 0.02–0.1% by weight metal based on reactive solids. Free radical inhibitors such as substituted phenolic derivatives and quaternary ammonium salts can be added to extend shelf life. Many types of fillers such as ground limestone, kaolin clays, ground silicas, etc., can be utilized to improve physical properties. Pigments may be used particularly for gel coat compositions. Given the significant lowering effect of the metal salt monomer on the viscosity of the composition, highly filled or pigmented compositions may be obtained with significantly higher solids content (higher filler or pigment content), with a better dispersion of the solid additives and with enhanced physical performances of the obtained composites or coatings.

5. Molding Process

The compositions of the invention can be used in either laminating, coating, or molding processes which are very typical in the art. Suitable laminating processes include, for example, sheet molding compound (SMC). Suitable coating processes include gel coats for open-mold SMC parts and in-mold coatings, for example, a suitable molding process would be bulk molding compound (BMC).

The invention helps solve a problem which has been longstanding in the art of laminating, gel, coating resins, and BMC, i.e., the partial replacement of volatile monomers like styrene without a loss in physical properties like heat distortion temperature. According to the present invention, replacement of a portion of such monomers by metallic monomers results in improvement in heat distortion temperature.

The following non-limiting examples illustrate a few embodiments of the invention.

While the invention has been described and exemplified in detail herein, various alternatives, alterations, and modifications should become apparent to those skilled in this art without departing from the spirit and scope of the invention.

EXAMPLES

In the following examples, all parts and percentages are by weight, unless otherwise indicated, and the following materials were used in the examples, have the following abreviations, and were supplied by the following supplier companies:

| Material description | Supplier |
| --- | --- |
| Dicyclopentadiene polyester (DCPD) | Aristech |
| DCPD ortho polyester (Aropol FRP A 220) | Ashland |
| ISO Polyester (Stypol 40-4339) | CCP |
| Vinyl ester resin (Hydrex 100/ Polylite 33350) | Reichold |
| Styrene | Arco Chemical |
| Vinyl toluene | Dow Del Tech |
| 12% cobalt promoter | Mooney Chemical |
| 15% potassium octoate promoter | Akcros Chemicals |
| Dimethylacetoacetamide (DMAA) | Eastman |
| 25% hydroquinone solution | Prepared in laboratory |
| Methylethylketone peroxide (MEKP) | Witco |
| 6 mole ethoxylated Bisphenol A dimethacrylate (CD-541) as reference | Sartomer |
| Ethylene glycol dimethacrylate (SR-206) as reference | Sartomer |
| Trimethylolpropane trimethacrylate (SR-350) as reference | Sartomer |
| Zinc diacrylate (SR-705) | Sartomer |
| Zinc dimethacrylate (SR-708) | Sartomer |
| Calcium diacrylate (SR-636) | Sartomer |

-continued

| Material description | Supplier |
| --- | --- |
| Epoxidized soy bean oil diacrylate (CN 111) | Sartomer |
| Diethylene glycol dimethacrylate (SR 231) as reference | Sartomer |

Example 1

Preparation of DCPD Polyester

A base polyester resin (hereafter referred to as "DCPD polyester") was prepared having the following composition:

| Component | Mole percent (for 100 moles of Maleic anhydride) |
| --- | --- |
| Dicyclopentadiene | 113 |
| Ethylene glycol | 60 |
| Maleic anhydride | 100 |

Example 2

Preparation of the Resin Formulation

A series of laminating resin formulations based on the DCPD polyester prepared in Example 1 were prepared and tested for cure performance, volatile content and physical properties, including Heat Distortion Temperature.

A masterbatch of neat DCPD polyester dissolved in styrene (80/20 by weight) was prepared by grinding the polyester to a fine powder with a mortar and pestal and then solubilizing it in styrene in with agitation. The polyester/styrene masterbatch was let down with additional reactive diluent, either styrene or (meth)acrylate monomer, accordingly. In the examples of the invention, 10% of the total styrene in the formulation was replaced by the metallic monomer which was dispersed into the masterbatch prior to letdown. The co-promoters (12% cobalt naphthenate, 15% potassium naphthenate and dimethyl acetoacetamide) and additional inhibitor (25% HQ solution) were then added. Finally, the MEK peroxide was added just prior to casting.

Example 3

Preparation of Clear Castings

Clear castings of various laminating resins were prepared to test volatile emissions, mechanical properties, and heat distortion temperature. Volatile emissions were tested according to Rule 1162 (casting 100 grams of formulation at ambient temperature into a 1 gallon paint can lid turned upside down on a top loading balance with a paper clip in the center bent into a 90 angle and measuring weight loss as the formulation as it gels or cures). The gel point is the point at which the paint can lid can be lifted by the paper clip after the material hardens around it. Clear castings for mechanical and thermal resistance properties were prepared by casting the formulations between two glass plates held together with binder clips and separated by a ⅛" gasket material as a spacer. The formulations were cured at ambient temperature (25° C./77F.) for 2 hours and then baked at 100° C. for 2 hours. Heat distortion temperature was tested according to ASTM D648.

Example 4

Testing of Clear Castings

The results of the testing of clear casting properties are showing in Table 1, and demonstrate that when styrene is partially replaced or completely replaced in the formulation by ethoxylated Bisphenol A dimethacrylate and ethylene glycol dimethacrylate (SR-206), or epoxidized soy bean oil diacrylate (CN 111) and trimethylolpropane trimethacrylate (SR-350), the volatile emissions are reduced while the heat distortion temperature is also reduced. In the formulations of the invention, where the metallic monomers were added, the heat distortion temperature was maintained or increased. In formulation # 3, 25% replacement of styrene resulted in a heat distortion temperature of 121° C. (249° F., 25° F. higher than the control formulation # 1 and 47–67° F. higher than the other (meth)acrylate monomer modified formulations).

TABLE 1

Summary of experimental results (weight %)

| Formulation # | 1 | 2 | 3 | 4 | 5 | 6 |
|---|---|---|---|---|---|---|
| Invention or comparative | Comp. | Comp. | Comp. | Inv. | Inv. | Inv. |
| DCPD Polyester | 60 | 30 | 60 | 60 | 60 | 60 |
| Styrene | 40 | — | 20 | 30 | 30 | 30 |
| Vinyl toluene | — | 10 | — | — | — | — |
| CD-541 | — | 40 | — | — | — | — |
| SR-206 | — | 20 | — | — | — | — |
| CN-111 | — | — | 10 | — | — | — |
| SR-350 | — | — | 10 | — | — | — |
| SR-705 | — | — | — | 10 | — | — |
| SR-708 | — | — | — | — | 10 | — |
| SR-636 | — | — | — | — | — | 10 |
| 12% cobalt | 0.3 | 0.3 | 0.3 | 0.3 | 0.3 | 0.3 |
| 15% potassium | 0.2 | 0.2 | 0.2 | 0.2 | 0.2 | 0.2 |
| DMAA | 0.3 | 0.3 | 0.3 | 0.3 | 0.3 | 0.3 |
| 25% HQ | 0.3 | 0.3 | 0.3 | 0.3 | 0.3 | 0.3 |
| MEKP | 1.5 | 1.5 | 1.5 | 1.5 | 1.5 | 1.5 |
| Heat distortion temperature ASTM D648 ° C. (° F.) | 107 (224) | 83 (182) | 94 (202) | 108 (226) | 121 (249) | 108 (226) |

Additional data are presented in Tables 2, 3, 4 with the performances of three types of resins:
DCPD modified ortho polyester resin (Table 2)
Iso polyester resin (Table 3)
Vinyl ester resin (Table 4)

Figure 1:
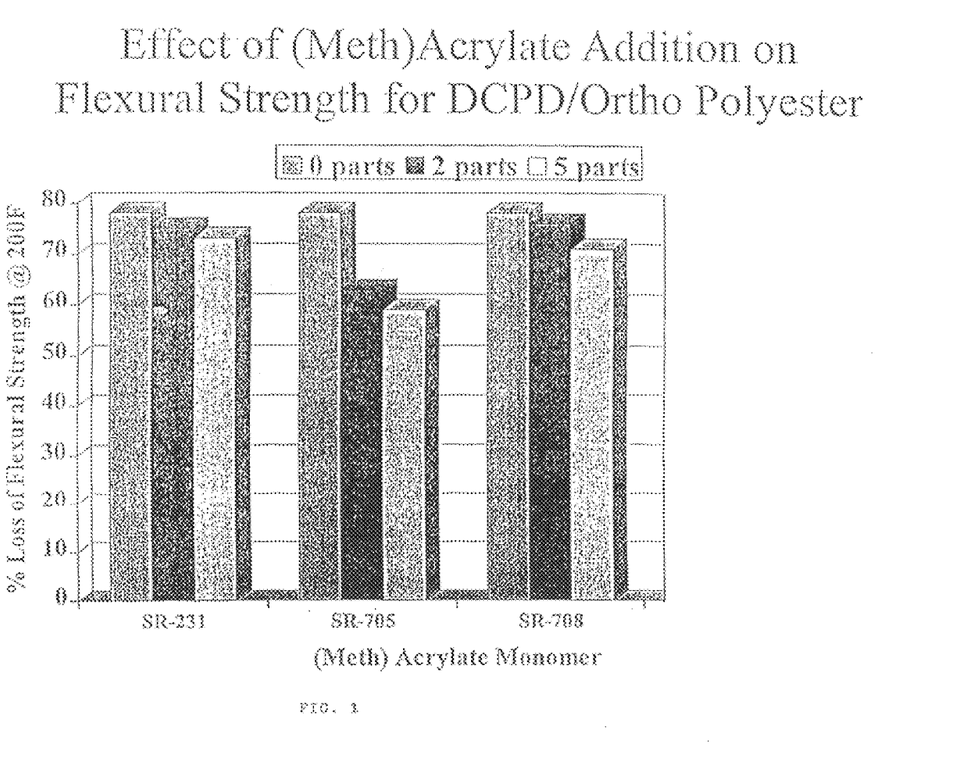
FIG. 1 shows the effect of (meth)acrylate addition on flexural strength for DCPC/ortho polyester.
Figure 2:
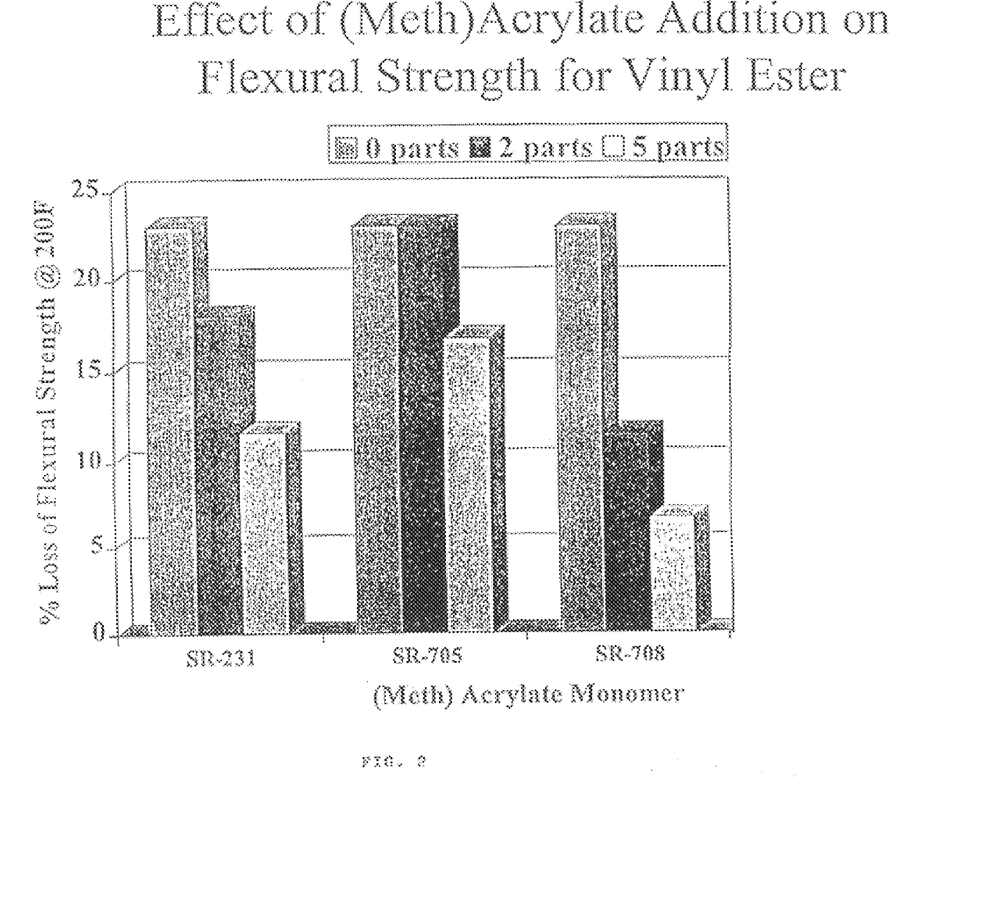
FIG. 2 shows the effect of (meth)acrylate addition on flexural strength for vinyl ester.
Figure 3:
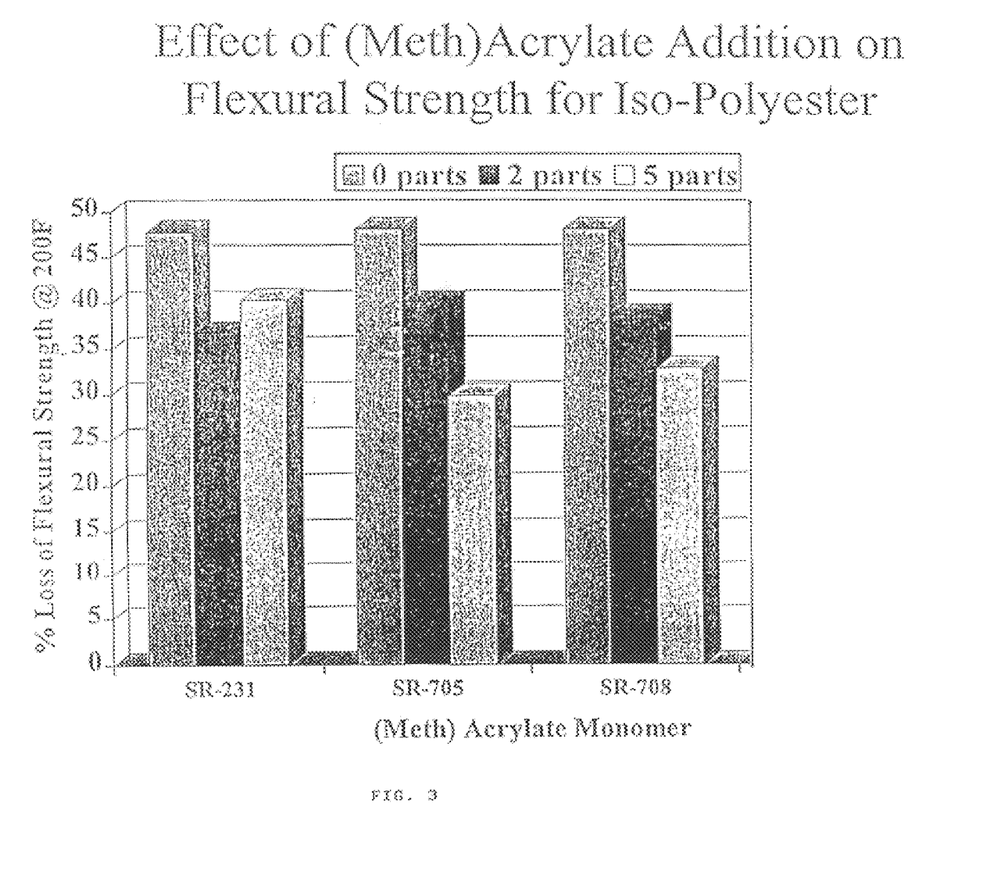
FIG. 3 is a chart showing the effect of (meth)acrylate addition on flexural strength.

Comparative thermal stability of flexural strength performances at high temperature (93° C./200F.) expressed in terms of % of loss of flexural strength with respect to room temperature performances are presented on FIG. 1 for DCPD modified ortho polyester resin, FIG. 2 for iso polyester resin and FIG. 3 for vinyl ester resin.

100 parts by weight of each resin were utilized as received (pre-diluted with styrene monomer and pre-promoted with Cobalt Drier and other accelerators of unknown quantity and type). 2 & 5 parts by weight, respectively, of the metallic monomers of the invention were added to the resins by mixing on a high shear mechanical mixer equipped with a cowles blade. Percent volatile content was calculated based on solids content of the formulation. Viscosity of each formulation was measured by Brookfield RVT Viscometer using #2 spindle at 3 rpm. Gel times were measured for each formulation initiated with 1.25 parts by weight of methylethylketone peroxide.

Significant viscosity reductions were observed for each resin when the metallic monomer was added as noted in the invention. to However, in order to have comparative data for the clear castings, a small percentage of fumed silica was added as a thixotrope to bring the viscosity up to that of the control. In addition, significant increases in gel times were observed for each resin when the metallic monomer was added. Since the target application requires 45–60 minutes, gel times additional Cobalt Octoate and dimethylacetoacetamide (DMAA) was added to reduce the gel time back to the control in order to do comparative testing.

Clear castings were prepared and tested similarly to Examples 3 & 4. Laminate preparation and testing was as follows:

1) laminates were prepared by hand lay-up fabrication using 3 plies of NEWFC 2308 (0/90 knit) fiberglass matting and the initiated resin formulations (1.25 parts by weight MEKP) of the invention
2) resulting panels were post-cured 2 hours at 65.5° C./15F. prior to testing
3) comparative flexural properties were tested at 25° C./77F. and 93° C./200F. using ASTM D790 in 0° reinforcement axis, loaded on the mold (CS) face of laminate

TABLE 2

Summary of Data for GP (DCPD/Ortho) Polyester (Ashland Aropol FRP A 220) for 100 parts of polyester + styrene (52% solids content)
Table 2a - Clear Castings

|  | Control | SR-705 | |
|---|---|---|---|
|  | (0 parts) | 2 parts | 5 parts |
| VOC content (base: solids content) | 48 | 47 | 46 |
| Viscosity Adjustment w/Thixotrope |  |  |  |
| Initial viscosity Pa · s/cps | 2.95/2950 | 1.84/1840 | 2.14/2140 |
| Final viscosity Pa · s/cps | 2.60/2600 | 1.92/1920 | 3.04/3040 |
| Amt. Fumed Silica added | none | 1.0% | 1.0% |
| Gel time Adjustment |  |  |  |
| Initial gel time (mins) | 64 | 155 | 165 |
| Final gel time (mins) | 50 | 69 | 72 |
| Amt. Co added | none | 0.20% | 0.20% |
| Amt. DMAA added | none | 0.15% | 0.15% |
| Tensile Properties (ASTM D638) |  |  |  |
| Tensile strength MPa/psi | 34.67/5.028 | 29.50/4.279 | 32.64/4.735 |
| Elongation at break (%) | 1.01 | 0.82 | 0.95 |

TABLE 2-continued

Summary of Data for GP (DCPD/Ortho) Polyester (Ashland Aropol FRP A 220)
for 100 parts of polyester + styrene (52% solids content)

Table 2a - Clear Castings

|  | Control | SR-705 | |
|---|---|---|---|
|  | (0 parts) | 2 parts | 5 parts |
| Tensile modulus MPa/Mpsi | 3357/0.487 | 3612/0.524 | 3275/0.475 |
| Flexural Properties (ASTM D790) | | | |
| Flexural strength MPa/psi | 57.31/8.313 | 55.86/8.102 | 55.85/8.101 |
| Flexural modulus MPa/Mpsi | 3667/0.532 | 3846/0.558 | 3777/0.548 |
| Barcol Hardness | 40 | 42 | 42 |
| Linear Shrinkage (%) | 1.88 | 1.76 | 1.65 |
| HDT, 1.82 MPa/264 psi (° C.) (ASTM 2583) | 67 | 63 | 65 |

TABLE 2b

Laminate Testing

|  | Control | SR-705 | | SR-708 | | SR-231 | |
|---|---|---|---|---|---|---|---|
|  | (0 parts) | 2 parts | 5 parts | 2 parts | 5 parts | 2 parts | 5 parts |
| Flexural properties @ 25° C./ 77 F. (ASTM D790) | | | | | | | |
| Flexural strength MPa/psi | 393.6/57.093 | 286.5/41.564 | 282.9/42.487 | 399.7/57.973 | 417.0/60.484 | 416.4/60.396 | 440.0/63.791 |
| Flexural modulus MPa/Mpsi | 11.825/1.715 | 9982/1.448 | 8886/1.289 | 11.926/1.730 | 11.665/1.692 | 12.512/1.815 | 12.285/1.782 |
| Flexural properties @ 93° C./ 200 F. | | | | | | | |
| Flexural strength MPa/psi | 87.0/12.622 | 106.5/15.445 | 119.3/17.302 | 96.3/13.966 | 116.6/17.742 | 125.1/14.908 | 122.9/17.246 |
| Flexural modulus MPa/Mpsi | 4058/0.589 | 5253/0.762 | 5625/0.816 | 4612/0.669 | 4991/0.724 | 4722/0.685 | 5053/0.733 |
| % of loss of flexural strength at 93° C. (200 F.) with respect to 25° C. (77 F.) | 77.9 | 62.8 | 59.3 | 75.9 | 70.7 | 75.3 | 73.0 |
| Barcol Hardness | 52 | 46 | 49 | 53 | 51 | 54 | 53 |

TABLE 3

Summary of Data for ISO Polyester (CCP Stypol 40-4339)
for 100 parts of polyester + styrene (53% solids content)

Table 3a - Clear Castings

|  | Control | SR-705 | |
|---|---|---|---|
|  | (0 parts) | 2 parts | 5 parts |
| VOC content (base: solids content) | 47 | 46 | 45 |
| Viscosity Adjustment w/Thixotrope | | | |
| Initial viscosity Pa · s/cps | 1.53/1530 | 0.23/230 | 0.24/240 |
| Final viscosity Pa · s/cps | 1.65/1650 | 0.77/770 | 0.99/990 |
| Amt. Fumed Silica added | none | 2.5% | 2.5% |
| Gel time Adjustment | | | |
| Initial gel time (mins) | 27 | 170 | 270 |
| Final gel time (mins) | 25 | 58 | 65 |
| Amt. Co added | none | 0.25% | 0.25% |
| Amt. DMAA added | none | 0.15% | 0.15% |
| Tensile Properties (ASTM D638) | | | |
| Tensile strength MPa/psi | 54.60/7.920 | 47.04/6.824 | 44.47/6.450 |
| Elongation at break (%) | 2.00 | 1.52 | 1.50 |
| Tensile modulus MPa/Mpsi | 2889/0.419 | 3020/0.438 | 3047/0.442 |
| Flexural Properties (ASTM D790) | | | |
| Flexural strength MPa/psi | 114.8/16.652 | 99.92/14.495 | 79.92/11.593 |
| Flexural modulus MPa/Mpsi | 3171/0.460 | 3330/0.483 | 3233/0.469 |
| Barcol Hardness | 40 | 42 | 42 |
| Linear Shrinkage (%) | 1.88 | 1.76 | 1.65 |

TABLE 3-continued

Summary of Data for ISO Polyester (CCP Stypol 40-4339)
for 100 parts of polyester + styrene (53% solids content)
Table 3a - Clear Castings

|  | Control | SR-705 | |
| --- | --- | --- | --- |
|  | (0 parts) | 2 parts | 5 parts |
| HDT, 1.82 MPa/264 psi (° C.) (ASTM 2583) | 67 | 63 | 65 |

TABLE 3b

|  | Laminate Testing | | | | | | |
| --- | --- | --- | --- | --- | --- | --- | --- |
|  | Control | SR-705 | | SR-708 | | SR-231 | |
|  | (0 parts) | 2 parts | 5 parts | 2 parts | 5 parts | 2 parts | 5 parts |
| Flexural properties @ 25° C./ 77 F. (ASTM D790) | | | | | | | |
| Flexural strength MPa/psi | 391.1/56730 | 342.0/49.619 | 320.3/46.464 | 447.6/64.931 | 436.8/63.364 | 418.8/60.747 | 410.3/59.517 |
| Flexural modulus MPa/Mpsi | 12071/1.751 | 11.623/1.686 | 10.913/1.583 | 12.740/1.848 | 12.953/1.879 | 12.912/1.873 | 12.885/1.869 |
| Flexural properties @ 93° C./ 200 F. | | | | | | | |
| Flexural strength MPa/psi | 202.7/29402 | 204.0/29.591 | 225.1/32.652 | 274.5/39.844 | 431.6/42.602 | 265.6/38.525 | 245.4/35.602 |
| Flexural modulus MPa/Mpsi | 8245/1.196 | 7431/1.078 | 8500/1.233 | 9452/1.371 | 9066/1.315 | 9238/1.340 | 9038/1.311 |
| % of loss of flexural strength at 93° C. (200 F.) with respect to 25° C. (77 F.) | 48.2 | 40.4 | 29.7 | 38.6 | 32.8 | 36.6 | 40.2 |
| Barcol Hardness | 54 | 49 | 53 | 47 | 46 | 52 | 51 |

TABLE 4

Summary of Data for Vinyl Ester (Reichold Hydrex 100/Polylite 33350)
for 100 parts of polyester + styrene (55% solids content)
Table 4a - Clear Castings

|  | Control | SR-705 | |
| --- | --- | --- | --- |
|  | (0 parts) | 2 parts | 5 parts |
| VOC content (base: solids content) | 45 | 44 | 43 |
| Viscosity Adjustment w/Thixotrope | | | |
| Initial viscosity Pa · s/cps | 2.37/2370 | 0.37/370 | 0.36/360 |
| Final viscosity Pa · s/cps | 3.12/3120 | 0.94/940 | 1.08/1080 |
| Amt. Fumed Silica added | none | 2.5% | 2.5% |
| Gel time Adjustment | | | |
| Initial gel time (mins) | 42 | 248 | 252 |
| Final gel time (mins) | 50 | 68 | 61 |
| Amt. Co added | none | 0.18% | 0.18% |
| Amt. DMAA added | none | 0.13% | 0.13% |
| Tensile Properties (ASTM D638) | | | |
| Tensile strength MPa/psi | 64.53/9.360 | 68.75/9.972 | 68.56/9.945 |
| Elongation at break (%) | 2.98 | 3.08 | 3.01 |
| Tensile modulus MPa/Mpsi | 2958/0.429 | 3061/0.444 | 3033/0.440 |
| Flexural Properties (ASTM D790) | | | |
| Flexural strength MPa/psi | 85.37/12.384 | 114.7/16.644 | 91.32/13.247 |
| Flexural modulus MPa/Mpsi | 2958/0.465 | 3399/0.493 | 3364/0.488 |
| Barcol Hardness | 35 | 39 | 36 |
| Linear Shrinkage (%) | 0.53 | 0.68 | 0.90 |
| HDT, 1.82 MPa/264 psi (° C.) (ASTM 2583) | 71 | 69 | 72 |

TABLE 4b

| | Control | SR-705 | | SR-708 | | SR-231 | |
|---|---|---|---|---|---|---|---|
| | (0 parts) | 2 parts | 5 parts | 2 parts | 5 parts | 2 parts | 5 parts |
| Flexural properties @ 25° C./ 77 F. (ASTM D790) | | | | | | | |
| Flexural strength MPa/psi | 358.4/51.993 | 327.3/47.471 | 332.2/48.189 | 444.7/64.507 | 414.1/60.066 | 461.3/66.918 | 429.2/62.263 |
| Flexural modulus MPa/Mpsi | 11.458/1.662 | 11.465/1.663 | 12.320/1.787 | 12.457/1.807 | 11.823/1.715 | 12.712/1.844 | 11.878/1.723 |
| Flexural properties @ 93° C./ 200 F. | | | | | | | |
| Flexural strength MPa/psi | 275.3/39.937 | 249.7/36.227 | 276.3/40.085 | 398.8/57.843 | 386.9/56.121 | 378.1/54.845 | 379.3/55.025 |
| Flexural modulus MPa/Mpsi | 9555/1.386 | 8969/1.301 | 9286/1.347 | 12.968/1.881 | 13.037/1.891 | 12.699/1.842 | 12.464/1.808 |
| % of loss of flexural strength at 93° C. (200 F.) with respect to 25° C. (77 F.) | 23.2 | 23.6 | 16.8 | 10.3 | 6.6 | 18.0 | 11.6 |
| Barcol Hardness | 53 | 53 | 46 | 54 | 54 | 54 | 54 |

While the invention has been described in detail herein, various modifications, alternatives, and improvements should become apparent to those skilled in this art without departing from the spirit and scope of the invention as set forth in the appended claims.

What is claimed is:

1. A composition in the form of a gel coat, binder, or laminating resin comprising (A) an unsaturated polyester resin which is the reaction product of one or more polyols and of one or more ethylenically unsaturated polycarboxylic acids, anhydrides, or amides, optionally of one or more saturated or aromatically unsaturated polycarboxylic acids and optionally of one or more polyethyleiically unsaturated monomers and/or a vinyl ester resin, (B) at least one first monomer selected from the group consisting of styrene, vinyl toluene, methyl methacrylate, N-vinyl pyrolidone, ethylene glycol dimethacrylate and the dimethacrylate of alkoxylated Bisphenol A, (C) at least 0.5 part by weight per 100 parts of (A), (B), and (C) of at least one second monomer selected from the group consisting of metal salts of alpha, beta-ethylenically unsaturated carboxylic acids wherein said metal is selected from the group consisting of calcium, zinc, magnesium, and aluminum, and (D) a peroxy free radical initiator.

2. The composition according to claim 1 wherein said composition comprises about 5 to 35 parts by weight of (B) and about 0.5 to 35 parts by weight of (C) with (B)+(C) comprising about 30 to about 50 parts of 100 parts by weight of (A)+(B)+(C).

3. The composition according to claim 2 wherein said composition comprises about 10 to 30 parts by weight of (B) and about 1 to 30 parts by weight of (C), with (B)+(C) from about 30 to about 50 parts for 100 parts by weight of (A)+(B)+(C).

4. The composition according to claim 1 further comprising from about 0.1 to about 2.0 parts of promoters and free radical initiators selected from the group consisting of cobalt naphthenate, potassium naphthenate, and dimethyl acetoacetamide, and methylethyl ketone peroxide, based on 100 parts of (A)+(B)+(C).

5. The composition according to claim 1 wherein said second monomer (C) is at least one metal multifunctional (meth)acrylate.

6. The composition according to claim 1 wherein said second monomer (C) is selected from the group consisting zinc diacrylate, zinc dimethacrylate, calcium diacrylate, and calcium dimethacrylate.

7. The composition according to claim 1 wherein said polyethylenically unsaturated monomer is present and is dicyclopentadiene.

8. The composition according to claim 1 wherein said polyol is selected from the group consisting of ethylene glycol, 1, 5-propanediol, propylene glycol, triethylene glycol, butylene glycol, glycerol, diethylene glycol, 1, 4, 6-hexanetriol, trimethylolpropane, trimethylolethane, dipropylene glycol, pentaerythritol, neopentyl glycol, and alkoxylated 2, 2-bis (4-hydroxyphenyl) propane.

9. The composition according to claim 1 wherein said ethylenically unsaturated polycarboxylic acids, anhydrides or amides are selected from maleic acid, fumaric acid, glutaconic acid, itaconic acid, chloromaleic acid, mesaconic acid, anhydrides thereof and amides derivatives thereof.

10. The composition according to claim 1 wherein said saturated or aromatically unsaturated polycarboxylic acids are present and are selected from the group consisting of phthalic acid, phthalic anhydride, isophthalic acid, tetrahydrophthalic acid, tetrahydrophthalic anhydride, hexahydrophthalic acid, endomethylene tetrahydrophthalic acid, glutaric acid, tetrachlorophthalic acid, suberic acid, hexachloroendomethylene tetrahydrophthalic acid, sebacic acid, succinic acid, and adipic acid.

11. The composition according to claim I wherein said unsaturated polyester is the reaction product of maleic anhydride, ethylene glycol, and Bisphenol A dicyclopentadiene.

12. The composition according to claim 1 wherein said first monomer is styrene and said second monomer is selected from the group consisting of zinc diacrylate, zinc dimethacrylate, and calcium diacrylate, and wherein the weight ratio of said first monomer to said second monomer is about 2:1 .

13. A method of reducing the amount of volatile emissions during the preparation of a polyester gel coat, binder, laminating resin or molding resin comprising providing a composition as defined in claim 1 and curing said composition.

14. A molded article prepared according to the method of claim 13 in a mold.

15. An article comprising a laminate prepared by molding the composition of claim 1 in the presence of glass fiber reinforcement.

16. An article comprising a coating prepared by curing the composition of claim 1.

17. A method of of reducing the amount of volatile emissions during the preparation of a a polyester gel coat, binder, laminating resin, or molding resin comprising preparing and reacting in the presence of a peroxy free radical initiator a composition comprising an unsaturated polyester resin which is the reaction product of one or more polyols and of one or more ethylenically unsaturated polycarboxylic acids, anhydrides, or arnides, and/or a vinyl ester resin, one or more first monomer selected from the group consisting of styrene, vinyl toluene, methyl methacrylate, N-vinyl pyrrolidone, ethylene glycol dimethacrylate, and the dimethacrylate of alkoxylated Bisphenol A, and at least 0.5 part per 100 parts of polyester resin and monomers of one or more second monomer selected from the group consisting of calcium, zinc, nagnesium and aluminum salts of alpha, beta-ethylenically unsaturated carboxylic acids.

* * * * *